United States Patent [19]

Tandai et al.

[11] Patent Number: 5,293,618
[45] Date of Patent: Mar. 8, 1994

[54] METHOD FOR CONTROLLING ACCESS TO A SHARED FILE AND APPARATUS THEREFOR

[75] Inventors: Michio Tandai, Yokohama; Masaaki Hama, Fujisawa; Fujio Fujita, Yokohama, all of Japan

[73] Assignees: Hitachi, Ltd., Tokyo; Hitachi Software Engineering Co, Ltd, Yokohama, both of Japan

[21] Appl. No.: 614,088

[22] Filed: Nov. 15, 1990

[30] Foreign Application Priority Data

Nov. 18, 1989 [JP] Japan .................. 1-300611

[51] Int. Cl.⁵ .................. G06F 7/00; G06F 7/20; G06F 7/04
[52] U.S. Cl. .................. 395/650; 364/DIG. 1; 364/246.6; 364/228.1; 364/243.41
[58] Field of Search .................. 395/650; 364/DIG. 1, 364/246.6, 228.1, 243.41

[56] References Cited

U.S. PATENT DOCUMENTS 4,823,310  4/1989  Grand ....................... 364/900
4,897,782  1/1990  Bennett et al. .............. 364/200

OTHER PUBLICATIONS

"DASD sharing with other systems", Manual for Programmer of Hitachi Program Product VOS 3/ES System, 1988, pp. 97-104.

Primary Examiner—Gareth D. Shaw
Assistant Examiner—A. Katbab
Attorney, Agent, or Firm—Antonelli, Terry, Stout & Kraus

[57] ABSTRACT

In an information processing system including a file shared by computer systems each having a central processing system and a main memory, a method for controlling access to the shared file includes a step of storing blocks read from the file into the main memory when the blocks of the file are updated, and a step of comparing at least a portion of the blocks held in a cache memory with at least a portion of the blocks stored in the main memory. When the comparison of at least the portion of the blocks held in the cache memory with at least the portion of the blocks stored in the main memory indicates mismatching, the block is read from the file into the main memory, and when the comparison indicates matching, the block of the main memory is updated. The data to be updated may be in a resident area, an input/output buffer or a same area.

4 Claims, 8 Drawing Sheets

FIG. 1
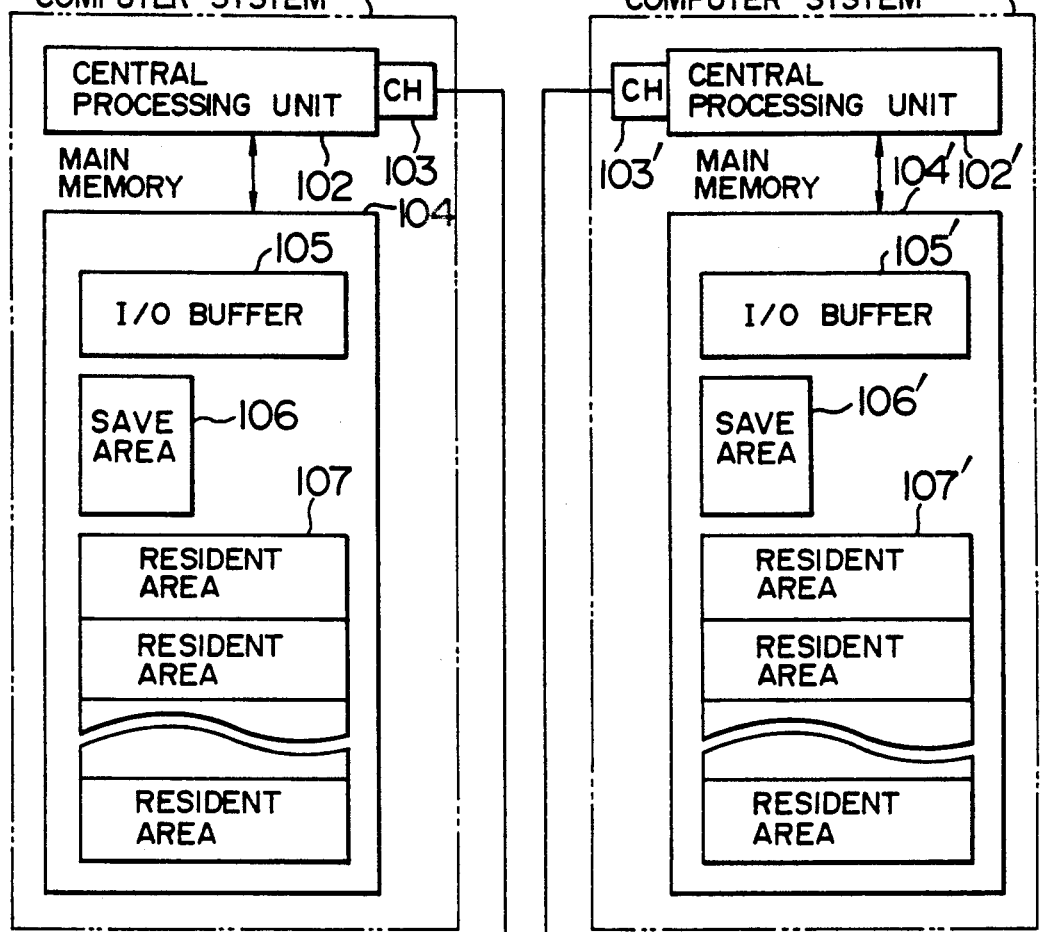
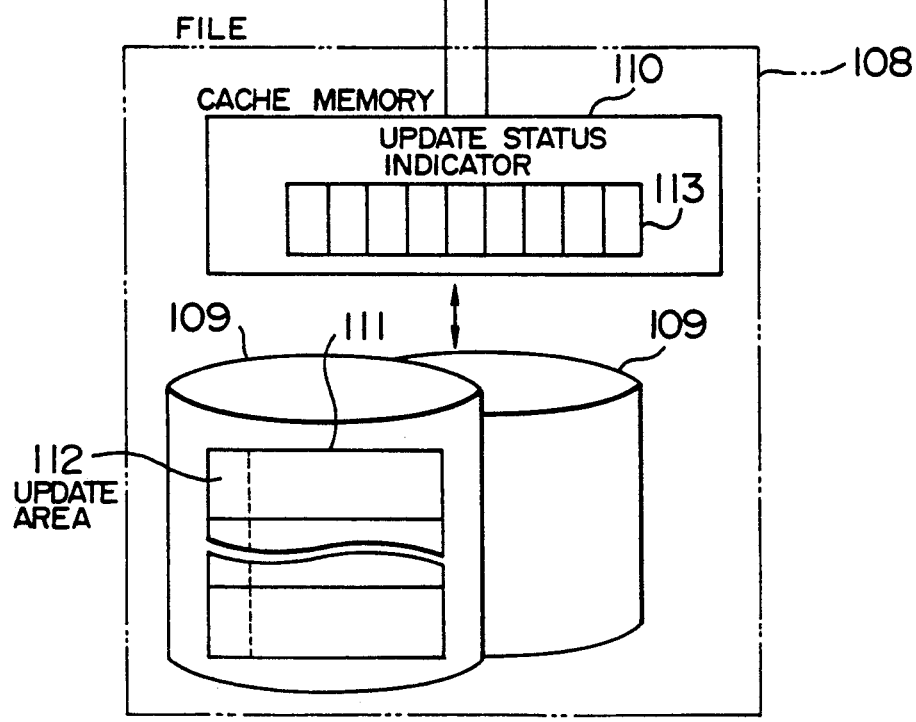

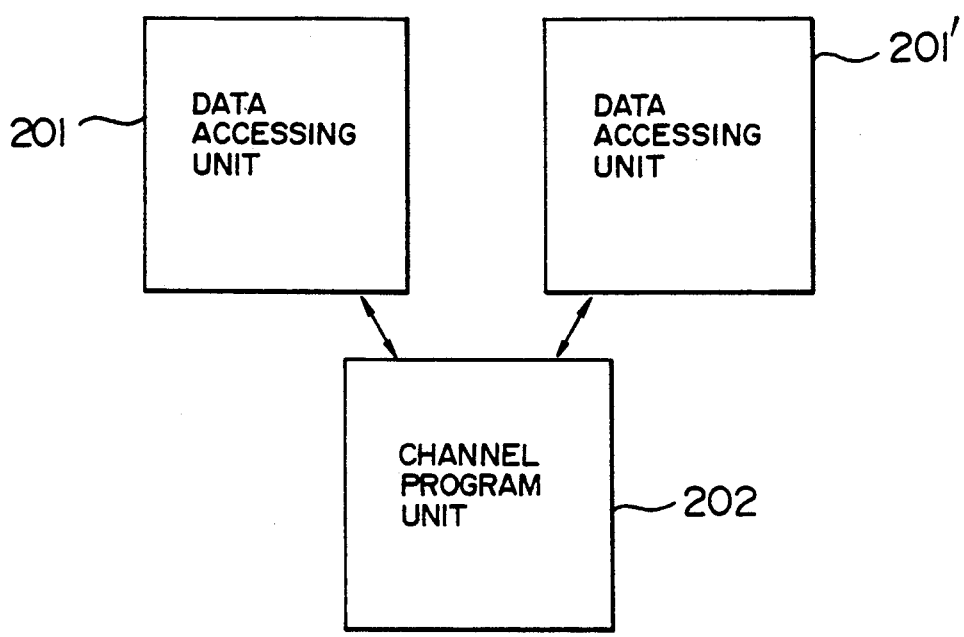
FIG. 2
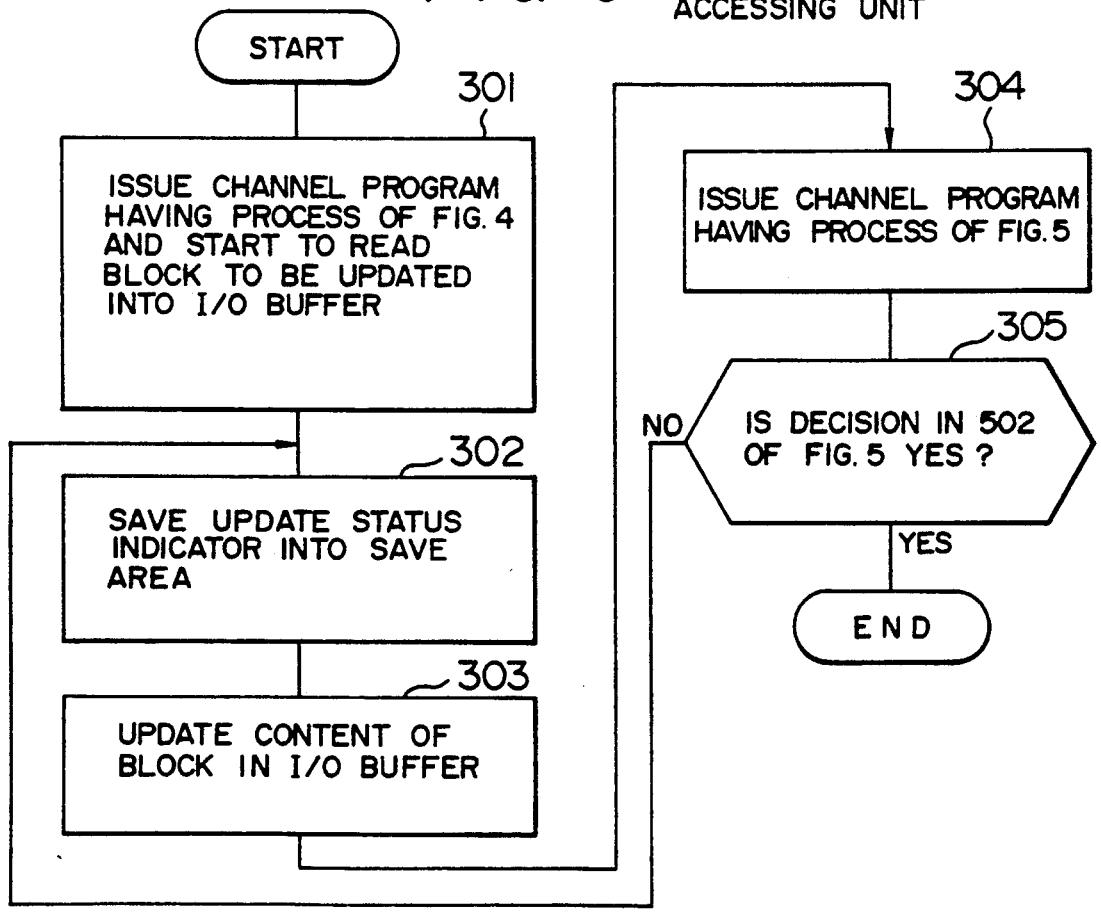
FIG. 3 OPERATION OF DATA ACCESSING UNIT

METHOD FOR CONTROLLING ACCESS TO A SHARED FILE AND APPARATUS THEREFOR

BACKGROUND OF THE INVENTION

The present invention relates to access control to a shared file stored, for example on a disk drive or magnetic tape drive which is shared and updated by a plurality of computer systems, and more particularly to access control which eliminates need for exclusive control in an update process and improves performance of data accessing in block writing.

In middle size to large size information processing systems, one disk file is frequently shared by a plurality of computer systems. Especially, a system register disk file on which files are registered is shared and frequently updated or overwritten.

In the past, when one file is shared by a plurality of computer systems, duplicate updating is prevented by exclusive control of the writing of a desired block to the reading for updating when data processing is to be performed for the desired stored block by a computer system. For example, as described in the "DASD Sharing with other systems" manual for Programmer of Hitachi Program Product VOS3/ES System, 1988, pages 97-104, when an I/O request to a shared file is issued, a disk drive on which the shared file is stored is exclusively occupied by the associated computer system by an instruction set such as a RESERVE macro which is issued from a CPU to the disk drive to designate and occupy the disk drive, and I/O requests from other computer systems have to wait until the occupation is released by an instruction set such as a DEQ macro which is issued to release the designated disk drive from the occupation (exclusive control).

The file such as a system register comprises an index field and a data field, and in many cases, it is a file structure having a pointer relationship among blocks of the file. When the file is shared with updating, the exclusive control is performed even for an input process without updating, during a period from the reading of an index having the pointer into a desired data block to the reading by the disk drive of the data block which is at the address pointed by the pointer. This is done in order to prevent process discrepancy that if addition (updating) of a record to a data block is done in an updating process by another computer system during the period from the reading of the index in the input process to the reading of the data block, the target data which was in the data block pointed by the index at the time of reading of the index in the input process has been moved to another data block and the target data which should exist cannot be located.

In the prior art, when the computer system accesses the shared file, the exclusive control is performed to suppress simultaneous access by other computer systems. Accordingly, the processing performance of the overall information processing system cannot be enhanced. In a single computer system, a resident area is provided in a main memory to reduce input/output operation of the file and enhance data accessing performance. On the other hand, in a multi-computer system, in the input process from the computer system to the shared file, the content of the desired block which has been previously written into the main memory is not used but the block on the file is fetched on the assumption that the block has been updated by a process executed by another computer system. Thus, the resident function cannot be used among the computer systems.

SUMMARY OF THE INVENTION

It is a first object of the present invention to enhance a processing efficiency of an overall information processing system by eliminating the exclusive control during a time period from the reading of a desired block to the writing of update data in an update process for a file shared by a plurality of computer systems with the updating, or from the reading of a block having a pointer such as an index to the reading of a desired block at an address pointed by the pointer.

It is a second object of the present invention to enhance a data access performance in a file shared by a plurality of computer systems with the updating by suppressing the reading from the file and using the content of the block stored in a main memory when the desired block has not been updated.

It is another object of the present invention to provide a system which enhances a data accessing performance of computer systems of a multi-computer system for a file shared by the computer system with the updating by using a resident area of a main memory of each of the computer systems and a cache memory of the file shared by the computer systems so that the input/output to the file medium is reduced.

In order to achieve the above objects, in accordance with the present invention, there are provided a cache memory for storing all or a predetermined portion of a block written from a shared file into a main memory, and means for comparing at the time of updating a block all or portion of the block stored in the cache memory with the content of data in the main memory and reading the shared file if the comparison indicates mismatching. In order to support the above sequence, there is provided a scheme wherein when a block on the shared file to be accessed is written into the main memory, an entire portion of the block or a portion of the block which uniquely represents an update status of the block (hereinafter referred to as an update indicator) is also stored in the cache memory. The entire block in the cache memory or the update indicator is updated in the cache memory when the block is written into the file. Thus, the cache memory can also be shared by the plurality of computer systems. By comparing the entire block in the cache memory or the update indicator with the entire content of the block or the content of the update area stored in the main memory when the block was written into the main memory, it is possible to determine whether the block has been updated by a process of another computer system or not, without actually reading the block stored in the file. The decision may be made without physical movement such as the movement of an access arm of a disk drive or the rotation of a disk. Since no physical movement which occupies a considerable portion of an input/output time to the disk file is involved, the decision time for the process of another computer system is very small and negligible.

When the block is written in a block update process, the content of the cache memory is compared with the content of the corresponding data stored in the main memory to determine whether the updating has been made by a process of another computer system during a time period from the reading of the block to the writing. In the writing of the block for updating, the content when the block was written into the main memory is compared with the content of the cache memory, and if the comparison matches, it means that no updating by another computer system has been made and the block is updated. If the comparison mismatches, the block is read out. In this manner, the data is correctly updated without the exclusive control and the duplicate updating by the plurality of computer systems is prevented.

In a file having a structure which has a pointer relationship such as an index shared by a plurality of computer systems with the updating, when a target block is read in an input process is which an index block having a pointer is written into the main memory and the target block is read based on an address pointed by the pointer, the content of the index block written into the main memory is compared with the content of the index block stored in the cache memory to determine whether the index block has been updated by another computer system during a time period from the reading of the index block to the reading of the target block. Namely, it is determined whether the address of the target block may be determined at the time of reading of the target block based on the content of the index block at the time of writing into the main memory. Thus, when the target block is read, the content of the index block stored in the main memory is compared with the content of the index block stored in the cache memory, and if the comparison matches, the target block is read, and if the comparison mismatches, the index block is read. In this manner, the process from the reading of the index block having the pointer to the reading of the target block at the address pointed by the pointer is correctly carried out without exclusive control.

Further, by comparing the update indicator of the block which is in the cache memory when the block is read with the update indicator of the block which was in the main memory when the block was written into the main memory, it is possible to determine whether the content of the block stored in the main memory can be used as it is or not. If the comparison matches, the input/output operation to the file which is accompanied by the physical movement is not carried out but the content of the block stored in the main memory is used as it is. If the comparison mismatches, the block is read from the file. In this manner, the input/output operation to the file which is accompanied by the physical movement can be reduced. A high advantage is expected particularly when the present technique is applied to the index having a high access frequency and a small storage capacity.

BRIEF DESCRIPTION OF THE DRAWINGS

FIG. 1 shows as system configuration of one embodiment of the present invention, FIG. 2 shows a relational configuration of processing units of the present invention, FIG. 3 shows a process of a data accessing unit which eliminates exclusive control in an update process.

DESCRIPTION OF THE PREFERRED EMBODIMENTS

Figure 4:
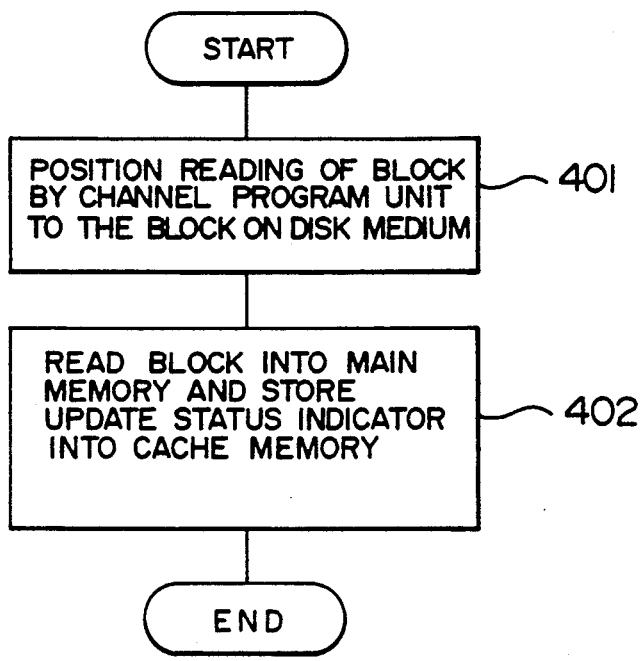
FIG. 4 shows a process of a channel program unit for block reading used in FIG. 3.

Embodiments of the present invention will now be explained with reference to the accompanying drawings.

FIG. 1 shows a system configuration of one embodiment of the present invention, in which two computer systems 101 and 101' share a common file 108. In the following description, the file 108 is a disk file. The disk file 108 includes a plurality of disk media 109 and a cache memory 110. A block data in a block 111 stored on the disk medium 109 contains a data field stored in an predetermined update area 112 to represent an update status. The update status of the block can be detected by checking the update area 112. The computer system 101 includes a central processing unit 102, a channel 103 and a main memory 104. The central processing unit 102 starts an input/output operation and carries out arithmetic and logical operations, and the channel 103 controls the input/output to the disk file 108 to transfer data with the main memory 104. The main memory 104 has an input/output buffer 105 for the block 111 on the disk medium 109 of the disk file 108, a save area 106 for saving the update area 112 of the block 111, and a resident area 107 for reducing the input/output operation to the disk file 108. The cache memory 110 in the disk file 108 may store the entire block inputted or outputted by a command from the channel 103 or only the content of the update area which is a portion of the block. In the present embodiment, only the latter is stored at an update status indicator 113 in the cache memory 110.

FIG. 2 shows a relationship of the processing units of the present invention. In FIG. 2, numerals 201 and 201' denote data accessing units in the central processing units 102 and 102' of the computer systems 101 and 101' for executing I/O operations, and numeral 202 denotes a channel program unit for executing a channel program for the disk file in the input/output channel 103 or the disk file 108.

Figure 5:
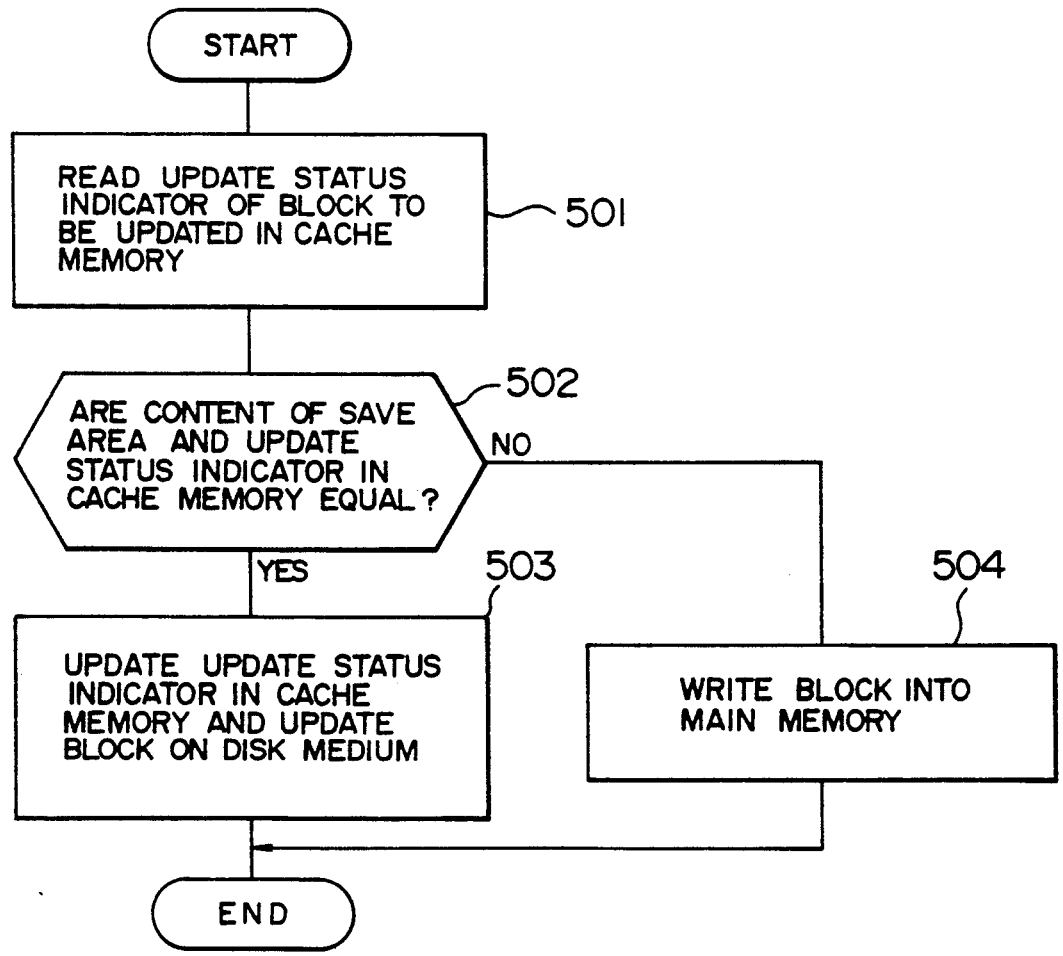
FIG. 5 shows a process of the channel program unit for block updating used in FIG. 3.

First, referring to FIGS. 3 to 5, the operation of the data accessing units 201 and 201' and the channel program unit 202 in the update process is explained. FIG. 3 shows a flow chart of the data accessing unit (201 in the present example) in the update process, FIG. 4 shows a flow chart of the channel program unit 202 for block reading, and FIG. 5 shows a flow chart of the channel program unit 202 for block updating.

The data accessing unit 201 first issues a channel program of a process shown in FIG. 4 to the channel program unit 202 in order to read, prior to the updating, the block 111 to be updated which is stored on the disk medium 109 of the disk file 108 into the input/output buffer 105 of the main memory 104 (step 301). In accordance with the process shown in FIG. 4, the channel program unit 202 locates the block 111 on the disk medium 109 (step 401), writes the block 111 into the input/output buffer 105 in the main memory 104, and stores a portion of the block 111 or the content of the update area 112 into the update status indicator 113 of the cache memory 110 (step 402).

The update area may store count data or time which may be used as an index of history of the updating of the block which is frequently updated. Alternatively, the entire content of the block 111 may be stored in the area 112. (This will be described later with reference to FIGS. 6 and 8).

The data accessing unit 201 than saves the content of the data stored in the input/output buffer 105 into the save area 106 (step 302). Then, the data accessing unit 201 updates the content of the block under consideration in the input/output buffer 105 (step 303) and writes it into the disk file 108 by issuing a channel program of a process shown in FIG. 5 to the channel program unit 202 (step 304). In accordance with the process shown in FIG. 5, the channel program unit first reads the content stored in the cache memory 110, that is, the content of the block to be updated which has been in the update status indicator 113 (step 501). Then, it compares the content of the update area 112 at the time of the reading which has been saved in the save area 106 of the main memory with the content of the update status indicator 113 in the cache memory 110 to determine whether the update status indicator 113 of the cache memory 110 of the disk file has been updated by the other computer system 101' after the reading of the block or not (step 502). Since the decision is made by comparing the data in the cache memory 110 without reading the block from the disk medium 109, no rotation waiting time of the disk medium 109 due to the read operation nor the physical movement due to the movement of the access arm of the disk file 108 is involved, and the process time is minimized. In the step 502, if there has been no updating by the other computer system 101' the decision is YES and the updated data is overwritten on the update status indicator 113 of the block in the cache memory 110 and it is written into the disk medium 109 (step 503) to complete the desired updating. In the step 502, if the decision is NO, it means that there has been updating of the disk data by the other computer system 101' the channel program unit 202 writes the block into the main memory 104 to update the data which has been updated by the other computer system (step 504).

On the other hand, the data accessing unit 201 examines the result of execution of the channel program of FIG. 5 by the channel program unit 202, and if the decision in the step 502 is YES, it means that the block has been read for updating, and the process is terminated. If the decision is NO, it means that the updating has been made by the other computer system 101', and the process returns to the step 302 to process block which has been updated by the other computer system 101' (step 305).

In this manner, by the processes of the data accessing unit and the channel program unit shown in FIGS. 3 to 5, the duplicate updating due to the duplication of the updating by a plurality of computer systems can be prevented without the exclusive control.

Figure 6:
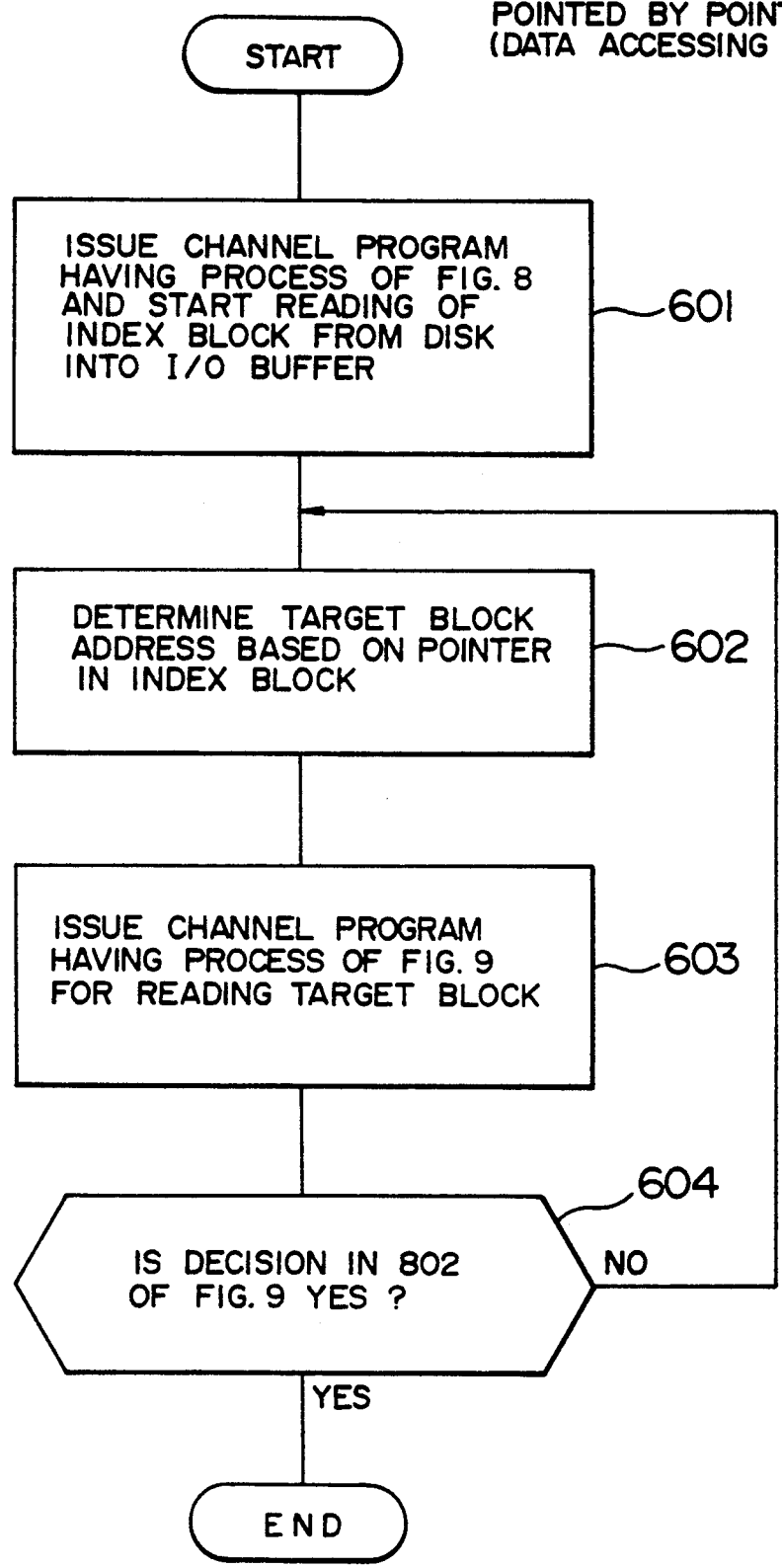
FIG. 6 shows a process of a data accessing unit which eliminates exclusive control in an input process for a file having an index.
Figure 7:
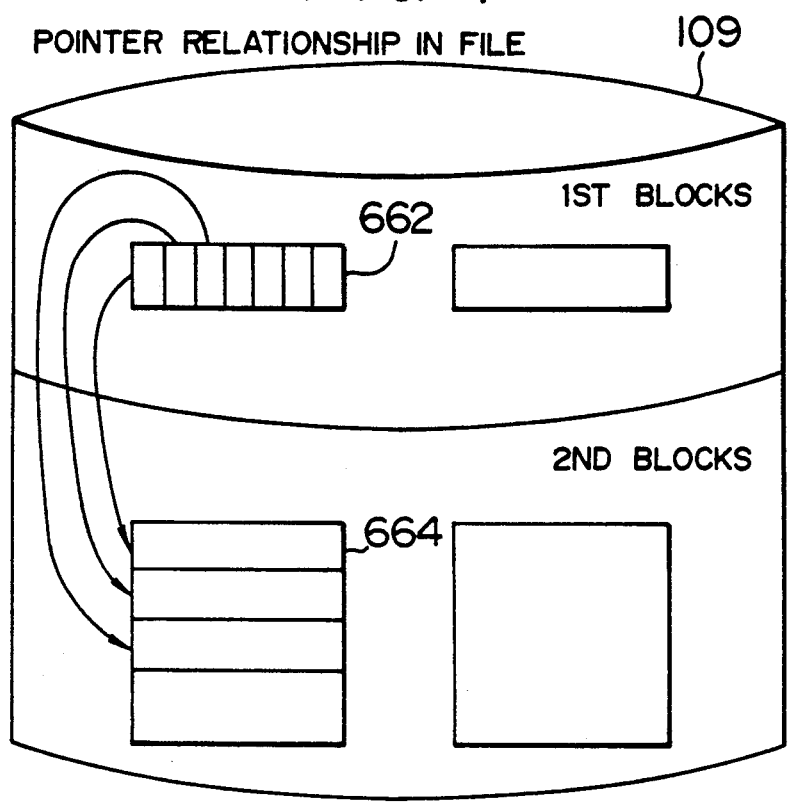
FIG. 7 shows a conceptual view of a pointer relationship among a plurality of blocks in a file.
Figure 8:
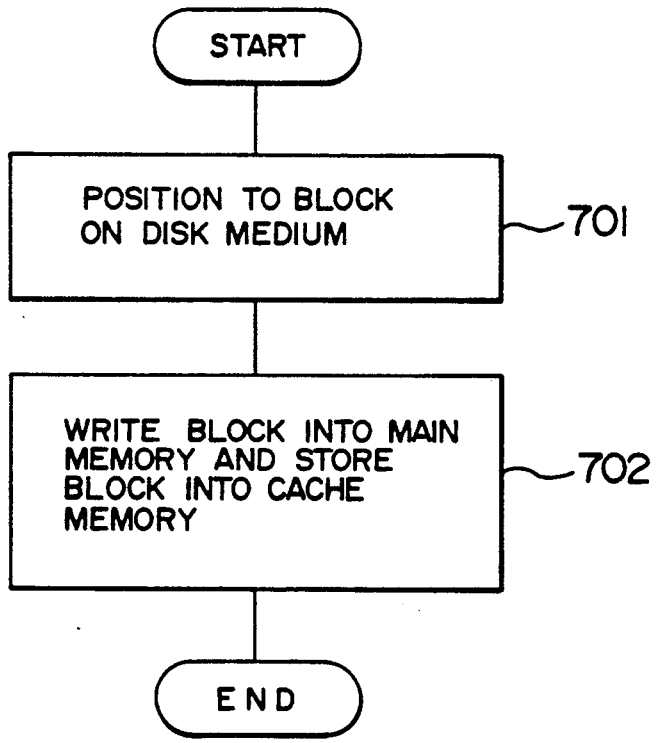
FIG. 8 shows a process of the channel program unit for index block reading used in FIG. 6.
Figure 9:
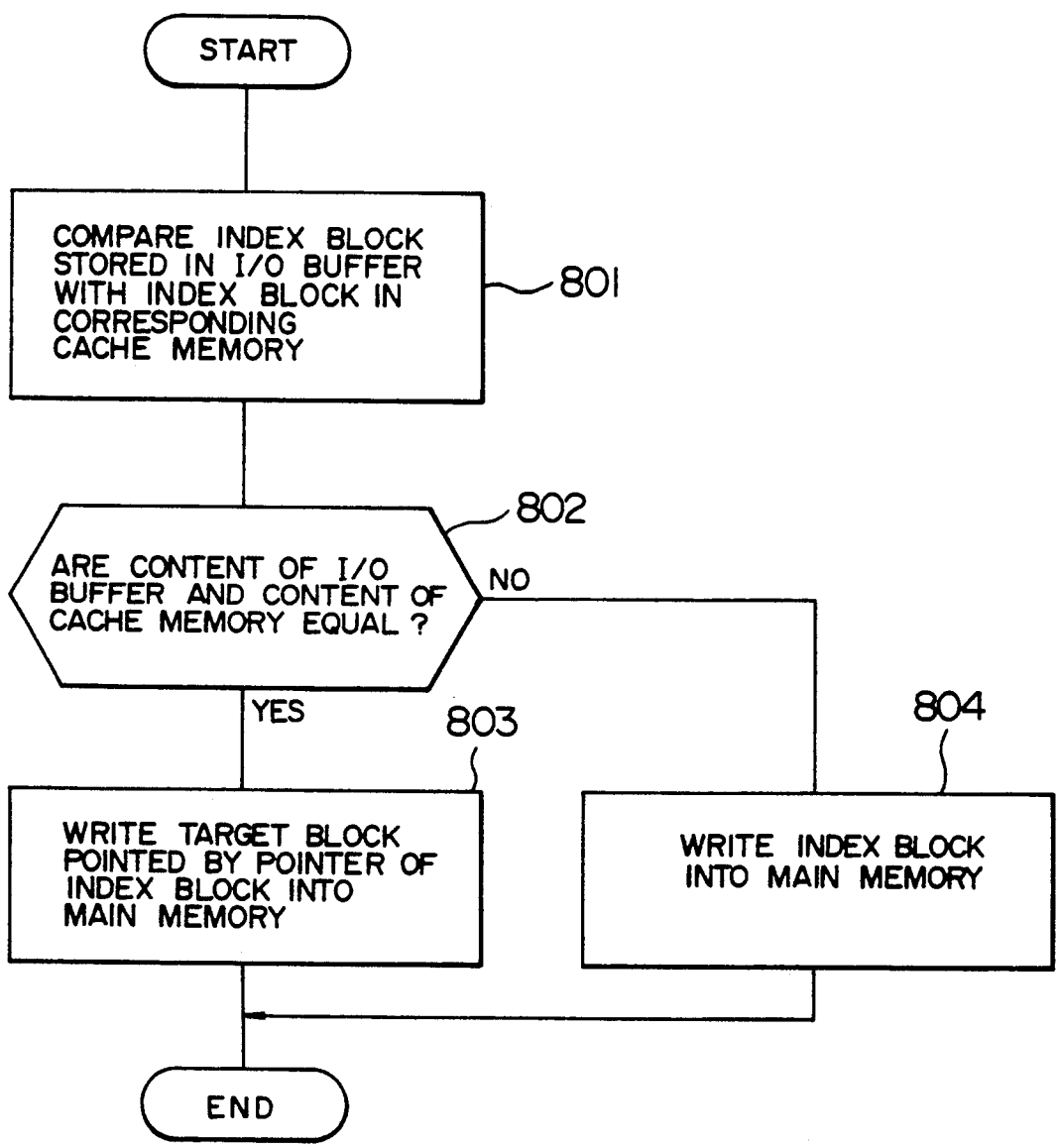
FIG. 9 shows a process of the channel program unit for reading a target block pointed by an index block, used in FIG. 6.

Referring now to FIGS. 6 to 9, the operation of the data accessing unit 201 and the channel program unit 202 when the input process for a block is carried out by tracking a pointer between blocks for a file having a structure which has a pointer relationship among blocks as represented by an index. FIG. 6 shows a flow chart of the data accessing unit 201 from the reading of an index block having a pointer from the disk file to the reading of a target block at the address pointed by the pointer, and FIG. 7 shows a pointer relationship between a block 664 in the file and an index block 662 having a pointer which indicates the location of the block. FIG. 8 shows a flow chart of the channel program unit 202 for reading the index block, and FIG. 9 shows a flow chart of the channel program unit 202 for reading the target block pointed by the index block.

The disk medium 109 shown in FIG. 7 has a first group of blocks 662 and a second group of blocks 664. The former contains an index to indicate the location of the latter on the disk medium.

The data accessing unit 201 first issues a channel program of the process shown in FIG. 8 to the channel program unit 202 in order to write the index block stored on the disk medium 109 of the disk file 108 into the input/output buffer 105 of the main memory 104 (step 601). The process of the channel program of FIG. 8 differs from that of FIG. 4 only in that the entire block instead of a portion of the block as in FIG. 4 is stored into the cache memory 110. The channel program of FIG. 4 may also be used in the present embodiment by using the pointer field in the index block of FIG. 4 as the update status indicator. In response to the issuance of the channel program of FIG. 8, the channel program unit 202 positions a read head to the block 111 to be read on the disk medium 109 (step 701) and reads the block into the input/output buffer 105 in the main memory 104 and also stores the content of the block 111 into the cache memory 110 (step 702).

Then, the data accessing unit 201 determines the address of the target block based on the pointer in the fetched index block (step 602), and issues the channel program of FIG. 9 to the channel program unit 202 to read the target block (step 603). In accordance with the process of FIG. 9, the channel program unit 202 compares the content of the index block fetched into the input/output buffer 105 of the main memory 104 with the content of the index block stored in the cache memory 110 (step 801) to determine whether the index block has been updated by the other computer system 101' during a time period from the reading of the index block to the reading of the target block (step 802). If the comparison matches (YES in the step 802), it means that there has been no updating of the index block by the other computer system 101' and the pointer of the index block stored in the input/output buffer 105 may be used. Thus, the target block designated by the pointer is read (step 803). If the content of the index block has not been modified, it is necessary for the processing unit which updates the index block and the target block pointed by the pointer of the index block to follow the process sequence of first updating the index block and then updating the target block, or carry out the exclusive control during a time period from the updating of the target block to the updating of the index block to prevent the input/output operation during the period from the updating of the target block to the updating of the index block in order to assure that the content of the target block pointed by the pointer of the index block matches the content of the index block. If the decision in the step 802 is NO, it means that there has been updating of the index block by the other computer system 101' and the index block is written again into the input/output buffer 105 to recycle the process (step 804). Like the step 502 of FIG. 5, the decision of the step 802 can be processed in a minimum process time without rotation waiting time of the disk medium.

On the other hand, the data accessing unit 201 examines the result of execution of the channel program of FIG. 9, and if the decision in the step 802 is YES, it means that the target block has been written, and the process is terminated. If the decision is NO, it means that there has been updating by the other computer system 101' and the process returns to the step 602 to recycle the process (step 604).

By the processes of the data accessing unit and the channel program unit shown in FIGS. 6 to 9, the exclusive control in the input process of the file can be eliminated where the file having the structure which has the pointer relationship among blocks is shared by a plurality of computer systems with the updating.

Figure 10:
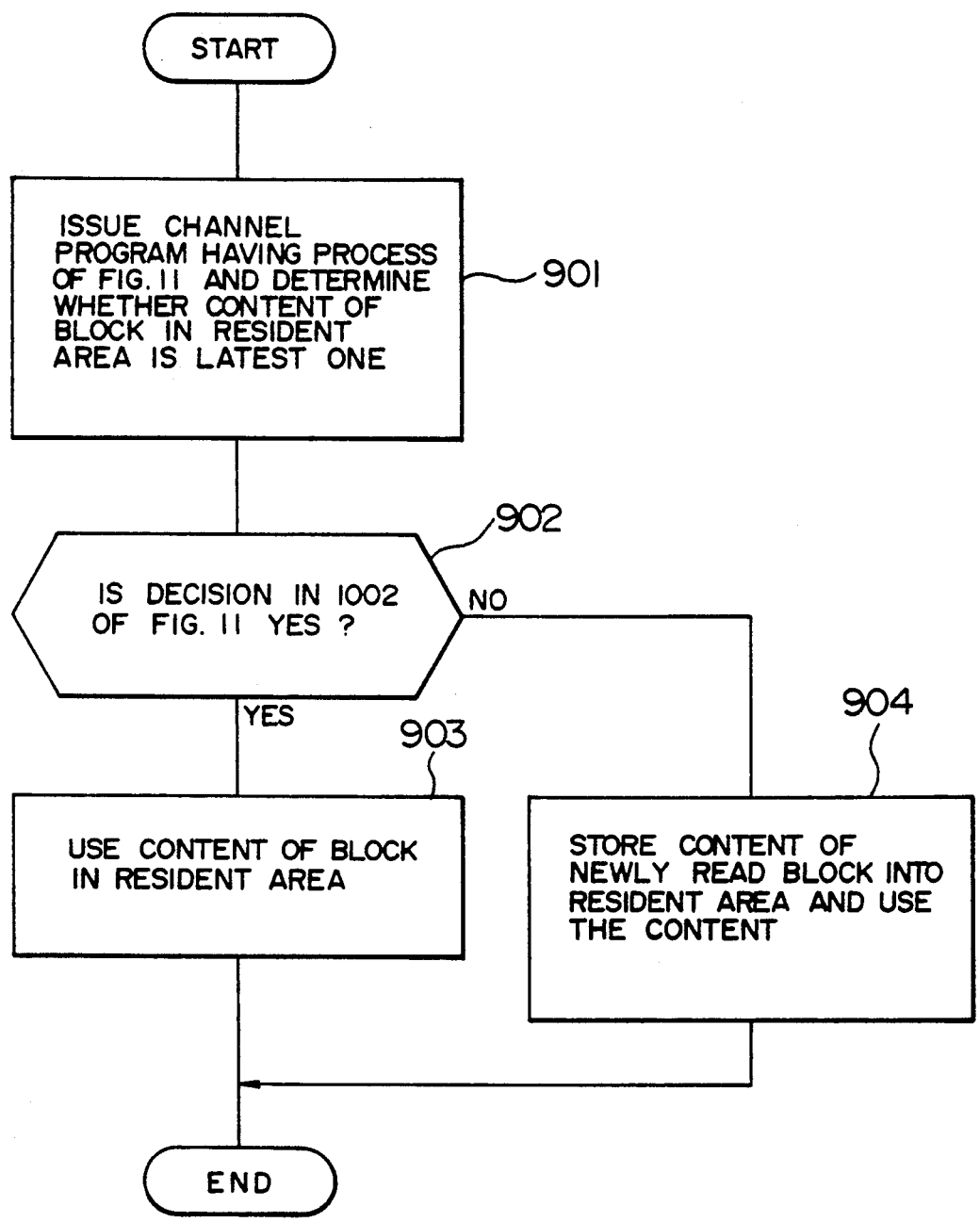
FIG. 10 shows a process of the data accessing unit for block reading by utilizing a residential area in a main memory.
Figure 11:
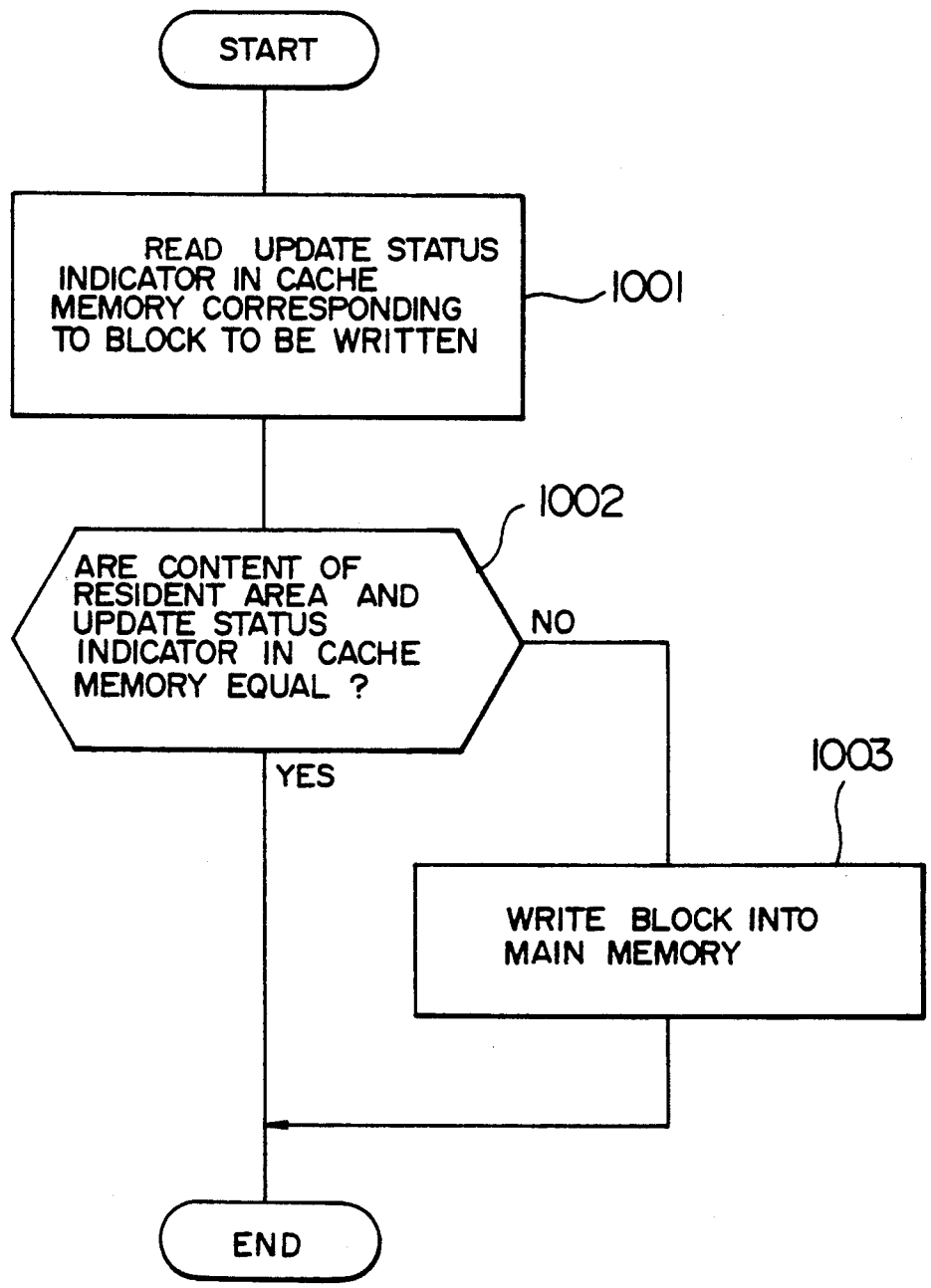
FIG. 11 shows a process of the channel program unit for block reading used in FIG. 10.

Referring now to FIGS. 10 and 11, the enhancement of performance of data accessing by the resident area 107 of the block on the main memory 104 for each of the computer systems 101 and 101' is explained. FIG. 10 shows a flow chart of the data accessing unit 201 for reducing the input/output operation to the disk medium 109 to enhance the speed of data accessing by providing the resident area 107 in the main memory 104, and FIG. 11 shows a flow chart of the channel program unit 202 for reading the block.

The data accessing unit 201 first issues the channel program of FIG. 11 to the channel program unit 202 (step 901) to determine whether the content of the block in the resident area 107 of the main memory 104 is the latest one or not, that is, whether the content of the block in the resident area 107 may be used as it is or not. The channel program unit 202 reads the update status indicator 113 in the cache memory 110 corresponding to the block be read (step 1001) to and determines if the content of the update area in the block in the resident area 107 is equal to the content of the update status indicator 113 in the cache memory 110 (step 1002). If they are equal, it means that the content of the block in the resident area 107 may be used as it is (YES in the step 1002), and the process is terminated. If they are not equal or the content corresponding to the block has not yet been stored in the update area 113 of the cache memory 110 (NO in the step 1002), the block is read from the disk medium 109 (step 1003). If the content corresponding to the block has not been stored in the update status indicator 113 of the cache memory 110, the update status indicator is newly stored into the cache memory 110.

On the other hand, the data accessing unit examines the result of execution of the channel program in FIG. 11 (step 902). If the decision in the step 1002 is YES, the content of the block in the resident area 107 is used for the processing (step 903), and if the decision is NO, the block newly written from the disk medium 109 to the input/output buffer 105 is stored into the resident area 107 and the content of the block is used for the processing (step 904).

By the processes shown in FIGS. 10 and 11, a portion of the block is stored in the update status indicator 113 of the cache memory 110. The content of the update status indicator 113 is compared with the update status indicator in the block in the resident area 107 of the main memory 104 so that the high performance and high efficiency data accessing with the resident area 107 of the main memory of the computer system is attained in the disk file shared by the computer systems 101 and 101' with the updating. Since only a portion of the block need be stored in the cache memory 110, a memory capacity required for the cache memory 110 is small.

Further, like in the step 502 of FIG. 5, the comparison in the cache memory 110 is done in a minimum process time without the rotation waiting time of the disk medium 109.

We claim:

1. An information processing system comprising:
   a plurality of computer systems each including a central processing unit, a channel connected to the central processing unit, and a main memory connected to the central processing unit; and
   a shared storage device connected to the channel of each of the computer systems for storing a plurality of data blocks each including an update area indicating an update status of the associated data block;
   wherein the shared storage device includes a cache memory connected to the channel of each of the computer systems; and
   wherein the central processing unit and the channel of each of the computer systems include means for
   reading a data block to be updated from the shared storage device,
   storing the data block to be updated in the main memory of the associated computer system,
   storing at least the update area of the data block to be updated in the cache memory as an update status indicator,
   updating the data block to be updated in the main memory,
   reading the update status indicator from the cache memory,
   determining whether the update status indicator read from the cache memory and a corresponding portion of the updated data block in the main memory are equal,
   if the update status indicator and the corresponding portion of the updated data block are equal, updating the update status indicator in the cache memory, reading the updated data block from the main memory, and storing the updated data block in the shared storage device in place of the data block to be updated, and
   if the update status indicator and the corresponding portion of the updated data block are not equal, reading the data block to be updated from the shared storage device, storing the data block to be updated in the main memory, and repeating the preceding functions beginning with updating the data block to be updated in the main memory.

2. An information processing system comprising:
   a plurality of computer systems each including a central processing unit, a channel connected to the central processing unit, and a main memory connected to the central processing unit; and
   a shared storage device connected to the channel of each of the computer systems for storing a plurality of data blocks each including an update area indicating an update status of the associated data block;
   wherein the main memory of each of the computer systems includes a resident area for storing one of the data blocks stored in the shared storage device;
   wherein the shared storage device includes a cache memory connected to the channel of each of the computer systems for storing at least the update area of the one data block as an update status indicator; and
   wherein the central processing unit and the channel of each of the computer systems include means for reading the update status indicator from the cache memory, determining whether the update status indicator read from the cache memory and a corresponding portion of the one data block in the resident area are equal, if the update status indicator and the corresponding portion of the one data block are equal, using a content of the one data block in the resident area for a processing, and if the update status indicator and the corresponding portion of the one data block are not equal, reading the one data block from the shared storage device, storing the one data block in the resident area, and using the content of the one data block in the resident area for the processing.

3. An information processing method for an information processing system, the information processing system comprising:

a plurality of computer systems each including a central processing unit, a channel connected to the central processing unit, and a main memory connected to the central processing unit; and a shared storage device connected to the channel of each of the computer systems for storing a plurality of data blocks each including an update area indicating an update status of the associated data block;

wherein the shared storage device includes a cache memory connected to the channel of each of the computer systems;

the information processing method comprising the steps of:

reading a data block to be updated from the shared storage device;

storing the data block to be updated in the main memory of the associated computer system;

storing at least the update area of the data block to be updated in the cache memory as an update status indicator;

updating the data block to be updated in the main memory;

reading the update status indicator from the cache memory;

determining whether the update status indicator read from the cache memory and a corresponding portion of the updated data block in the main memory are equal;

if the update status indicator and the corresponding portion of the updated data block are equal, updating the update status indicator in the cache memory, reading the updated data block from the main memory, and storing the updated data block in the shared storage device in place of the data block to be updated; and if the update status indicator and the corresponding portion of the updated data block are not equal, reading the data block to be updated from the shared storage device, storing the data block to be updated in the main memory, and repeating the preceding functions beginning with updating the data block to be updated in the main memory.

4. An information processing method for an information processing system, the information processing system comprising:

a plurality of computer systems each including a central processing unit, a channel connected to the central processing unit, and a main memory connected to the central processing unit; and a shared storage device connected to the channel of each of the computer systems for storing a plurality of data blocks each including an update area indicating an update status of the associated data block;

wherein the main memory of each of the computer systems includes a resident area for storing one of the data blocks stored in the shared storage device; and wherein the shared storage device includes a cache memory connected to the channel of each of the computer systems for storing at least the update area of the one data block as an update status indicator;

the information processing method comprising the steps of:

reading the update status indicator from the cache memory;

determining whether the update status indicator read from the cache memory and a corresponding portion of the one data block in the resident area are equal;

if the update status indicator and the corresponding portion of the one data block are equal, using a content of the one data block in the resident area for a processing; and if the update status indicator and the corresponding portion of the one data block are not equal, reading the one data block from the shared storage device, storing the one data block in the resident area, and using the content of the one data block in the resident area for the processing.

* * * * *